(12) United States Patent
Kim et al.

(10) Patent No.: US 12,023,952 B2
(45) Date of Patent: Jul. 2, 2024

(54) SECURITY ITEM USING INTENSITY OF FLUORESCENT MATERIALS, AND USER IDENTIFICATION SYSTEM USING SAME

(71) Applicant: KOREA MINTING, SECURITY PRINTING & ID CARD OPERATING CORPORATION, Daejeon (KR)

(72) Inventors: Hyun Jun Kim, Daejeon (KR); Il Hoon Choi, Daejeon (KR); Hong Keon Kim, Daejeon (KR); Hyun Jin Oh, Sejong (KR)

(73) Assignee: KOREA MINTING, SECURITY PRINTING & ID CARD OPERATING CORPORATION, Daejeon (KR)

( * ) Notice: Subject to any disclaimer, the term of this patent is extended or adjusted under 35 U.S.C. 154(b) by 17 days.

(21) Appl. No.: 17/789,130

(22) PCT Filed: Sep. 4, 2020

(86) PCT No.: PCT/KR2020/011899
§ 371 (c)(1),
(2) Date: Jun. 24, 2022

(87) PCT Pub. No.: WO2022/050448
PCT Pub. Date: Mar. 10, 2022

(65) Prior Publication Data
US 2023/0339253 A1    Oct. 26, 2023

(30) Foreign Application Priority Data
Sep. 3, 2020 (KR) .................. 10-2020-0112202

(51) Int. Cl.
*G01N 21/64* (2006.01)
*B42D 25/378* (2014.01)
*G07D 7/12* (2016.01)
(52) U.S. Cl.
CPC .......... *B42D 25/378* (2014.10); *G01N 21/64* (2013.01); *G01N 2021/6497* (2013.01); *G07D 7/12* (2013.01); *G07D 2207/00* (2013.01)

(58) Field of Classification Search
CPC ............... B42D 25/378; G01N 21/64; G01N 2021/6497; G07D 7/12; G07D 2207/00
See application file for complete search history.

(56) References Cited

U.S. PATENT DOCUMENTS

2008/0024771 A1    1/2008  Crawford et al.

FOREIGN PATENT DOCUMENTS

| | | | | |
|---|---|---|---|---|
| EP | 1672568 A1 * | 6/2006 | ............. | G06K 19/14 |
| ES | 2884268 T3 * | 12/2021 | ............ | B41M 3/144 |
| KR | 100945471 | 3/2010 | | |
| KR | 100967087 | 7/2010 | | |
| KR | 20110093145 | 8/2011 | | |
| KR | 20120095004 | 8/2012 | | |
| KR | 101238197 | 2/2013 | | |
| KR | 20130129368 | 11/2013 | | |
| KR | 20140142984 | 12/2014 | | |
| KR | 101599808 | 3/2016 | | |
| KR | 20160077612 | 7/2016 | | |
| KR | 102008934 | 8/2019 | | |
| KR | 102076059 | 2/2020 | | |

OTHER PUBLICATIONS

International Search Report—PCT/KR2020/011899 dated Apr. 23, 2021.

* cited by examiner

*Primary Examiner* — David P Porta
*Assistant Examiner* — Fani Polyzos Boosalis
(74) *Attorney, Agent, or Firm* — CANTOR COLBURN LLP

(57) ABSTRACT

Provided is a security item using the intensity of fluorescent materials and a user identification system using same, the security item containing fluorescent materials that have intrinsic luminescent characteristics when irradiated with excitation light, wherein the fluorescent materials are contained in an amount of 0.2-3.0 wt % on the basis of the weight of the security item, and the difference in relative value calculated by formula (I), according to a 0.2-0.5 wt % difference in the amount of the fluorescent materials, is at least 3. Formula (I): the relative value of $\chi$ wt % of fluorescent materials=(the relative intensity of the emission wavelength of $\chi$ wt % of the fluorescent materials×100)/(the relative intensity of the emission wavelength of 3.0 wt % of the fluorescent materials).

11 Claims, No Drawings

SECURITY ITEM USING INTENSITY OF FLUORESCENT MATERIALS, AND USER IDENTIFICATION SYSTEM USING SAME

TECHNICAL FIELD

The present invention relates to a security item using the intensity of a fluorescent material and relates to a security item using the intensity of the fluorescent material, which improves security using a fluorescent material with different luminous wavelengths and has identifiability, and a user identification system using the same.

BACKGROUND ART

Security materials can be said to be essential in areas where forgery prevention is required. For example, security materials are used for securities such as a check, a stamp, a gift certificate, a certificate, and a bond in the field of security printing.

Recently, the need for forgery prevention technology through security materials is emerging not only in the printing field, but also in various fields including textile products such as clothing and shoes, various electronic products, and engineering plastics used in structural materials of automobiles, aircraft, and the like. As the cases of counterfeiting and tampering of the above-mentioned items are continuously emerging, it is urgent to develop a security item that can solve this problem.

In order to solve this problem, the products are marked by security elements such as trademarks, for example, woven labels and printed name labels, but these security elements are easy to forge and can be made simply with a sample, and there is a disadvantage in that it is very difficult to distinguish them from the genuine products.

Accordingly, Korean Patent No. 0945471 discloses: a plurality of the fluorescent threads for security formed on both sides of the security thread, in which a first fluorescent material of a different color is bonded to a position spaced apart by a certain interval from one end of the fluorescent thread for security having a predetermined length as a security thread applied to the security paper, a security thread is formed to extend at a predetermined interval to the other side of the first fluorescent material, a second fluorescent material is bonded to the other end of the security thread, and the first fluorescent material and the second fluorescent material are spaced apart from each other by a predetermined interval; and a security paper formed by including the fluorescent threads for security. Korean Patent No. 0967087 discloses a security paper having improved security as the color of one strand of the fluorescent color yarn is freely expressed by producing a fluorescent color yarn by finely cutting it in the direction perpendicular to the fluorescent color band after gravure-printing fluorescent colors to be expressed such as red, yellow-green, blue, and green in the form of a band having a width at regular intervals with a size of 0.5 mm to 0.75 mm for each color by appropriately arranging invisible fluorescent colorings or near-infrared absorbing colorings on the surface of polyethylene terephthalate (PET) film. Korean Patent Application Laid-Open No. 2016-0077612 discloses a security pattern sheet including: a fluorescent printing layer printed using a fluorescent printing ink containing a fluorescent pigment; and an ultraviolet fluorescence quenching layer laminated on the fluorescent printing layer and printed using an ink for forming a security pattern, in which the image of the security pattern recognized by the eye under visible light and the image of the security pattern recognized by the eye under ultraviolet light are different from each other.

In the case of the security item as described above, most technologies are a technology that determines whether the security item is counterfeited or not by containing a fluorescent material used as a security material on the sheet and detecting it. Due to the evolution of highly developing measuring equipment, there have been problems in that security elements can be easily recognized from general equipment, as well as that the recognized security elements are easily copied as they are.

Therefore, it is necessary to study a security item that cannot be duplicated not only so as to prevent the recognition itself of the security elements including the security material, but also to have the same security characteristics as the security elements although the security elements are recognizable.

DISCLOSURE

Technical Problem

The present invention was invented to solve the problems of the conventional art as described above, and an object of the present invention is to provide a security item using the intensity of a fluorescent material, which can determine whether the item is authentic or not through a difference in the intensity depending on the content of a fluorescent material having intrinsic luminescence properties when irradiating excitation light contained in the security item.

Further, an object of the present invention is to provide a user identification system that can identify a user by using a security item using the intensity of the fluorescent material of the present invention.

Technical Solution

The present invention provides a security item using the intensity of a fluorescent material, as a security item containing a fluorescent material having intrinsic luminescence properties upon irradiation with excitation light, characterized in that the fluorescent material is contained in an amount of 0.2 to 3.0 wt % of the security item, and the difference in the relative value calculated by Equation (1) below according to the 0.2 to 0.5 wt % difference of the fluorescent material content is 3 or more.

$$\text{Relative value of } \chi \text{ wt \% content of the fluorescent material} = \frac{(\text{relative intensity of emission wavelength of } \chi \text{ wt \% of fluorescent material} \times 100)}{(\text{relative intensity of emission wavelength of 3.0 wt \% of fluorescent material})} \quad \text{Equation (1):}$$

Furthermore, there is provided a security item using the intensity of a fluorescent material, characterized in that the fluorescent material has a relative value of 5 to 20 when it is contained in an amount of 0.2 wt % of the security item.

Furthermore, there is provided a security item using the intensity of a fluorescent material, characterized in that the difference in the relative value according to the 0.2 to 0.5 wt % difference of the fluorescent material content is 5 to 30.

Furthermore, there is provided a security item using the intensity of a fluorescent material, characterized in that the fluorescent material is contained in an amount of 0.5 to 2.5 wt % of the security item.

Furthermore, there is provided a security item using the intensity of a fluorescent material, characterized in that the security item is any one of a textile fabric, a film, paper, and a plastic injection molded part.

Furthermore, there is provided a user identification system, as a user identification system using the security item, characterized by including: a security item which is formed by dividing the content of the fluorescent material contained in the security item for each user; and a detector that irradiates excitation light to the fabric-type security item to determine whether it is authentic or not and the user depending on the intensity of emission wavelength.

Further, there is provided a user identification system characterized in that the detector stores information on intrinsic luminescence properties according to the fluorescent material and intensity according to the fluorescent material content, and the stored storage value is compared with the measured measurement value to determine whether the item is authentic or not and the user.

Advantageous Effects

As described above, the security item using the intensity of a fluorescent material according to the present invention has the effect of enabling whether the item is authentic or not to be determined through a difference in the intensity according to the content of the fluorescent material having intrinsic luminescence properties when irradiating excitation light contained in the security item.

Further, the present invention has the effects that whether the item is authentic or not can be determined in more detail and the user can be determined through the intrinsic luminescence properties according to the fluorescent material and the intensity according to the fluorescent material content.

MODE FOR INVENTION

Hereinafter, a preferred embodiment of the present invention will be described in detail with reference to the drawings attached to the present invention. First, it should be noted that the same components or parts in the drawings are denoted by the same reference numerals whenever possible. In describing the present invention, detailed descriptions of related well-known functions or configurations are omitted so as not to obscure the gist of the present invention.

When unique manufacture and material allowable errors of numerical values are suggested to mentioned meanings of terms of degrees used in the present specification such as "about", "substantially", etc., the terms of degrees are used in the numerical values or as a meaning near the numerical values, and the terms of degrees are used to prevent that an unscrupulous infringer unfairly uses a disclosure content in which exact or absolute numerical values are mentioned to help understanding of the present invention.

The present invention is an invention which uses a fluorescent material having intrinsic luminescence properties when irradiating excitation light, and a fluorescent material having an emission wavelength in the invisible band or a fluorescent material having an emission wavelength in the visible band may be used as the fluorescent material.

When the fluorescent material having an emission wavelength in the invisible band is used, it not only makes security element recognition itself difficult through the security item, but although the security element can be recognized, it has the advantage of being able to distinguish and confirm the genuine security element and the duplicate/forged security element with high accuracy. When the fluorescent material having an emission wavelength in the visible band is used, it visually recognizes the security element of the security item so that the user's recognition of the genuine product can be increased, and there is an advantage of reducing the attempts of illegal production due to difficulties in duplication/counterfeiting.

The "intrinsic luminescence properties" mean properties of emission wavelength, emission intensity, afterglow pattern, and afterglow emission time (emission lifetime) which are unique for each fluorescent material.

In the present specification, the term "emission wavelength in the invisible band" refers to emission of wavelengths other than the wavelength of visible light, and for example, may refer to emission of light with a wavelength of an infrared band and/or an ultraviolet band. At this time, 'the emission wavelength in the invisible band' should not be interpreted as meaning that light is emitted only in a wavelength band in which there is no wavelength corresponding to visible light (380 to 780 nm) at all, but can be interpreted as emitting light with a wavelength of light in a band that is practically indistinguishable to the human eye, and the term "emission wavelength in the visible band" means that the wavelength of the wavelength band corresponding to visible light (380 to 780 nm) is included in the emission wavelength.

In the present specification, "a fluorescent material having an emission wavelength in the invisible band" or "a fluorescent material having an emission wavelength in the visible band" refers to a fluorescent material having a specific emission wavelength corresponding to during irradiation of excitation light. In this case, when excitation light is not irradiated, it does not normally emit light at the above wavelength, but it is needless to say that those having an afterglow or the like after irradiation of excitation light are also included.

It would be desirable for a security item containing a "fluorescent material having an emission wavelength" to be indistinguishable to the human eye from a normal item that does not contain a fluorescent material.

Any fluorescent material satisfying the conditions of the present invention, of the fluorescent material having an emission wavelength in the invisible band or the fluorescent material having an emission wavelength in the visible band, may be used. For example, $SrB_4O_7$:Eu, $Y_3Fe_4InO_{12}$:Er, and the invisible luminescent materials disclosed in Korean Patent No. 1238197 and Korean Patent No. 1599808 may be used as the fluorescent material having an emission wavelength in the invisible band, and $Y_2O_3$:Eu, $Y_2O_2S$:Tb, $Zn_2SiO_4$:Mn, $Y_3Fe_4InO_{12}$:Er, and PANAX RED LR-770, PANAX YELLOW-550, PANAX BLUE PKS-245, and PANAX LG-880 produced by Ukseung Chemical Co., Ltd may be used as the fluorescent material having an emission wavelength in the visible band.

The present invention relates to a security item containing a fluorescent material having intrinsic luminescence properties during irradiation of excitation light and relates to a security item using the intensity of the fluorescent material that may identify whether a security item is authentic or not and a user depending on the content of a fluorescent material to be contained, and a user identification system using the same.

The fluorescent material contained in the security item according to the present invention is preferably contained in an amount of 0.2 to 3.0 wt %, and it would be preferable that the difference in the relative value calculated by Equation (1) below according to the 0.2 to 0.5 wt % difference of the fluorescent material content is 3 or more.

Relative value of $\chi$ wt % content of the fluorescent material=(relative intensity of emission wavelength of χ wt % of fluorescent material×100)/
(relative intensity of emission wavelength of 3.0
wt % of fluorescent material)   Equation (1):

As the content of the fluorescent material contained in the security item increases, the relative intensity of the emission wavelength of the fluorescent material also increases. The relative intensity of the emission wavelength slowly increases when the content is low, but when the content is a certain amount or more, the relative intensity increases constantly in the form of a straight-line graph such as a linear function, and when the content exceeds the certain amount, the increase in the relative intensity tends to decrease.

The present invention is an invention for identifying whether the item is authentic or not and a user depending on the fluorescent material content in a section in which the relative intensity according to the fluorescent material content is constantly increased.

It is preferable that the fluorescent material contained in the security item according to the present invention be contained in an amount of 0.2 to 3.0 wt %. When the fluorescent material is contained in an amount of less than 0.2 wt %, the relative intensity is too low, and it may be difficult to detect it with a detector. Further, if the fluorescent material is contained in an amount exceeding 3.0 wt %, it may impair the physical properties of a material forming the security item, and when the fluorescent material is contained in an amount of 3.0 wt % or more, an increase range in the relative intensity of most fluorescent materials tends to slow so that it may be difficult to measure the content of the fluorescent material depending on the relative intensity.

The fluorescent material is preferably contained in an amount of 0.5 to 2.5 wt %. For most fluorescent materials, when the fluorescent material is contained in an amount of 0.5 to 2.5 wt % in a security item, the increase range in relative intensity is constant, and the deterioration of the physical properties of the material forming the security item due to the fluorescent material is not large.

When the fluorescent material is contained in an amount of 0.2 wt % of the security item, the relative value is preferably 5 to 20. When the fluorescent material is contained in an amount of 0.2 wt %, if the relative value is less than 5 or exceeds 20, the increase range in the relative intensity depending on the fluorescent material content tends not to be constant.

It is preferable that the difference in the relative value according to the 0.2 to 0.5 wt % difference in the fluorescent material content is 3 or more. If it is less than 3, accurate measurement may be difficult, and measurement is possible only with a detector enabling high sensitivity-measurement so that economic feasibility may decrease.

It is more preferable that the difference in the relative value according to the 0.2 to 0.5 wt % difference in the fluorescent material content is 5 to 30. When the difference in the relative value exceeds 30, the increase range in the relative intensity depending on the fluorescent material content may not be constant.

Even more preferably, the difference in the relative value is 3 or more depending on the 0.2 wt % difference in the fluorescent material content, and the difference in the relative value is 5 or more depending on the 0.5 wt % difference therein. In case of having such a difference value, it is easy to identify whether the item is authentic or not and the user by applying the content of fluorescent material to a security item in various ways.

The security item to which the present invention may be applied as described above may be any one of a textile fabric, a film, paper, and a plastic injection product.

The 'textile fabric' refers to a sheet-shaped item made of fibers, such as woven fabrics, knitted fabrics and non-woven fabrics formed of fibers.

The fluorescent material may be contained in the security item in various ways. In the case of textile fabric, the fluorescent material may be contained in the textile fabric during manufacturing of the fiber, or it may be contained in the textile fabric by a method such as coating. The fluorescent material may be contained in the polymer resin of a film or a plastic injection product, and in the case of paper, the fluorescent material may be contained in pulp, or it may be contained in the finished paper by a method such as coating.

The user identification system using the security item using the intensity of the fluorescent material according to the present invention may include a security item formed by dividing the content of the fluorescent material contained in the security item for each user and a detector for determining whether the item is authentic or not and the user depending on the intensity of the emission wavelength by irradiating excitation light to the fabric-type security item.

That is, the security item is an item in which the content of the fluorescent material is set so as to be distinguished from each other for each user so that the fluorescent material is contained in a set amount.

The detector, as a device capable of measuring the intrinsic luminescence properties according to fluorescent materials and the intensity according to the content of the fluorescent material, may identify whether the item is authentic or not and the user by measuring the content of the fluorescent material through measurement of the type and relative intensity of the fluorescent material contained in the security item.

The detector disclosed in Korean Patent No. 2076059 including a light emitting unit emitting light, a light receiving unit receiving a signal that is discharged from the light emitting unit to emit light from a fluorescent material, and a control unit determining whether a detection target is authentic or not based on the signal received from the light receiving unit.

The detector stores information on the intrinsic luminescence properties according to the fluorescent materials and the intensity according to the fluorescent material content so that it will be possible for the detector to measure whether the item is authentic or not and the user more quickly and simply by comparing the stored storage value and the measured measurement value.

The user identification system according to the present invention including the detector as described above will be able to determine whether the item is authentic or not in more detail and determine the user by determining the type of the fluorescent material through the intrinsic luminescence properties of the fluorescent material and determining the content of the fluorescent material through the emission intensity of the fluorescent material.

Hereinafter, the present invention will be described in more detail through Examples. These Examples are only for illustrating the present invention, and it will be apparent to those of ordinary skill in the art that the scope of the present invention is not to be construed as being limited by these Examples.

Hereinafter, Specific Examples of a security item using the intensity of a fluorescent material according to the present invention are shown, but the present invention is not limited the Examples.

Example 1

After containing the invisible luminescent material of Korean Patent No. 1238197 as a fluorescent material in a polyethylene terephthalate resin, a film-shaped security item was manufactured.

The content of the fluorescent material is shown in Table 1.

Example 2

Although it was manufactured in the same manner as in Example 1 above, a film-shaped security item was manufactured using $SrB_4O_7$:Eu as a fluorescent material.

Relative Intensities and Relative Values of Examples

Table 1 shows the measured relative intensities by irradiating the films containing the fluorescent materials prepared in Examples 1 and 2 with excitation light in the ultraviolet wavelength band and measuring the relative intensities of emission wavelengths in the near-infrared wavelength band.

The relative intensities were measured using Edinburgh's FLS 1000 Photoluminescence Spectrometer, and the relative values were calculated by Equation (1) below.

$$\text{Relative value of } \chi \text{ wt \% content of the fluorescent material} = \frac{(\text{relative intensity of emission wavelength of } \chi \text{ wt \% of fluorescent material} \times 100)}{(\text{relative intensity of emission wavelength of 3 wt \% of fluorescent material})} \quad \text{Equation (1)}$$

TABLE 1

| Classification Content (wt %) | Example 1 Relative intensity (A.U.) | Example 1 Relative value | Example 2 Relative intensity (A.U.) | Example 2 Relative value |
|---|---|---|---|---|
| 0.2 | 4800 | 13.48 | 5900 | 6.41 |
| 0.4 | 5850 | 16.43 | 8200 | 8.91 |
| 0.6 | 8390 | 23.57 | 15400 | 16.74 |
| 0.8 | 11100 | 31.18 | 22500 | 24.46 |
| 1.0 | 13800 | 38.76 | 29600 | 32.17 |
| 1.2 | 16330 | 45.87 | 35500 | 38.59 |
| 1.4 | 18900 | 53.09 | 42200 | 45.87 |
| 1.6 | 21500 | 60.39 | 49440 | 53.74 |
| 1.8 | 24150 | 67.84 | 56300 | 61.19 |
| 2.0 | 26600 | 74.72 | 62200 | 67.609 |
| 2.2 | 28550 | 80.2 | 68110 | 74.033 |
| 2.4 | 30450 | 85.53 | 74200 | 80.65 |
| 2.6 | 32300 | 90.73 | 80190 | 87.16 |
| 2.8 | 34010 | 95.53 | 85900 | 93.37 |
| 3.0 | 35600 | 100 | 92000 | 100 |
| 3.2 | 36900 | 103.65 | 95400 | 103.7 |
| 3.4 | 37890 | 106.43 | 97850 | 106.36 |

As shown in Table 1, when there are differences in the contents of the fluorescent materials by 0.2 wt % in both Examples 1 and 2 according to the present invention, differences in the relative values are mostly 5 to 7 to enable the relative intensities according to the contents to be distinguished so that whether the item is authentic or not and the user may be identified through this. The relative value differences between the fluorescent material contents 0.2 wt % and 0.4 wt % in Examples 1 and 2 above are 2.95 and 2.5, and the fluorescent material is preferably contained in an amount of 0.4 wt % or more, more preferably 0.5 wt % or more.

Further, it may be seen that the increase range in the relative intensity is slowed from 2.8 wt % of the fluorescent material content of Example 1 so that the difference in the relative value falls to 5 or less, and it may be seen that the increase range in the relative intensity is slowed from 3.0 wt % of the fluorescent material content of Example 2 so that the difference in the relative value falls to 5 or less.

Therefore, when the fluorescent material contained in the security item is contained in an amount of 0.5 to 2.5 wt %, the increase range in the relative intensity is constant, and it will be easy to measure this and identify whether the item is authentic or not and the user.

The invention claimed is:

1. A security item using the intensity of a fluorescent material, as a security item containing a fluorescent material having intrinsic luminescence properties upon irradiation with excitation light, characterized in that the fluorescent material is contained in an amount of 0.2 to 3.0 wt % of the security item, and the difference in the relative value calculated by Equation (1) below according to the 0.2 to 0.5 wt % difference of the fluorescent material content is 3 or more, $$\text{Relative value of } y \text{ wt \% content of the fluorescent material} = \frac{(\text{relative intensity of emission wavelength of } y \text{ wt \% of fluorescent material} \times 100)}{(\text{relative intensity of emission wavelength of 3.0 wt \% of fluorescent material})} \quad \text{Equation (1)}$$

2. The security item of claim 1, wherein the fluorescent material has a relative value of 5 to 20 when it is contained in an amount of 0.2 wt % of the security item.

3. A user identification system, as a user identification system using the security item of claim 2, characterized by including: a security item which is formed by dividing the content of the fluorescent material contained in the security item for each user; and a detector that irradiates excitation light to the fabric-type security item to determine whether it is authentic or not and the user depending on the intensity of emission wavelength.

4. The security item of claim 1, wherein the difference in the relative value according to the 0.2 to 0.5 wt % difference of the fluorescent material content is 5 to 30.

5. A user identification system, as a user identification system using the security item of claim 4, characterized by including: a security item which is formed by dividing the content of the fluorescent material contained in the security item for each user; and a detector that irradiates excitation light to the fabric-type security item to determine whether it is authentic or not and the user depending on the intensity of emission wavelength.

6. The security item of claim 1, wherein the fluorescent material is contained in an amount of 0.5 to 2.5 wt % of the security item.

7. A user identification system, as a user identification system using the security item of claim 6, characterized by including: a security item which is formed by dividing the content of the fluorescent material contained in the security item for each user; and a detector that irradiates excitation light to the fabric-type security item to determine whether it is authentic or not and the user depending on the intensity of emission wavelength.

8. The security item of claim 1, wherein the security item is any one of a textile fabric, a film, paper, and a plastic injection molded part.

9. A user identification system, as a user identification system using the security item of claim 8, characterized by including: a security item which is formed by dividing the content of the fluorescent material contained in the security item for each user; and a detector that irradiates excitation light to the fabric-type security item to determine whether it is authentic or not and the user depending on the intensity of emission wavelength.

10. A user identification system, as a user identification system using the security item of claim 1, characterized by including: a security item which is formed by dividing the content of the fluorescent material contained in the security item for each user; and a detector that irradiates excitation light to the fabric-type security item to determine whether it is authentic or not and the user depending on the intensity of emission wavelength.

11. The user identification system of claim 10, characterized in that the detector stores information on intrinsic luminescence properties according to the fluorescent material and intensity according to the fluorescent material content, and the stored storage value is compared with the measured measurement value to determine whether the item is authentic or not and the user.

* * * * *